United States Patent [19]

Mohiuddin

[11] 4,282,285

[45] Aug. 4, 1981

[54] PROCESS FOR PREPARING POLYURETHANE MOLDED PART

[75] Inventor: Gulam Mohiuddin, Brighton, Mich.

[73] Assignee: International Telephone & Telegraph Corporation, New York, N.Y.

[21] Appl. No.: 149,996

[22] Filed: May 15, 1980

Related U.S. Application Data

[63] Continuation-in-part of Ser. No. 87,768, Oct. 24, 1979, abandoned, which is a continuation-in-part of Ser. No. 38,505, May 14, 1979, abandoned.

[51] Int. Cl.³ .................... B29D 27/00; B32B 5/20; B32B 5/14
[52] U.S. Cl. .................................. 428/315; 264/46.6; 264/255; 264/267; 264/328.6; 264/DIG. 83; 428/423.3; 428/423.7; 428/424.2; 428/424.4; 428/424.6
[58] Field of Search ............. 264/46.6, 46.8, DIG. 83, 264/DIG. 18, 250, 255, 267, 328.2, 328.6; 428/315, 423.3, 423.7, 424.2, 424.4, 424.6

[56] References Cited

U.S. PATENT DOCUMENTS

| 3,468,991 | 9/1969 | Krug | 264/DIG. 18 |
| 3,487,134 | 12/1969 | Burr | 264/46.8 X |
| 3,694,530 | 9/1972 | Wolfe | 264/48 |
| 3,703,571 | 11/1972 | Roberts | 264/255 X |
| 3,745,203 | 7/1973 | Harper | 264/DIG. 83 |
| 3,795,722 | 3/1974 | Sassaman | 428/423.3 X |
| 3,871,911 | 3/1975 | Conacher | 428/423.3 |
| 3,873,407 | 3/1975 | Kumata et al. | 428/423.3 X |
| 3,892,885 | 7/1975 | Bragole | 428/423.3 X |
| 3,911,178 | 10/1975 | McDowell et al. | 428/423.3 X |
| 3,949,125 | 4/1976 | Roberts | 264/255 X |
| 3,970,732 | 7/1976 | Slaats et al. | 264/DIG. 83 |
| 3,981,671 | 9/1976 | Edwards | 264/DIG. 83 |
| 4,076,788 | 2/1978 | Ditto | 264/255 |

Primary Examiner—Philip Anderson
Attorney, Agent, or Firm—James B. Raden; Harold J. Holt

[57] ABSTRACT

A reaction injection molding process for producing a coated polyurethane part in which a liquid mixture of polyurethane reactants is injected into a mold where it is reacted and molded into a shaped part at elevated temperatures. The surface of the mold is coated, prior to molding, with a coating composition containing a polyurethane catalyst. The catalyst acts to bond the coating composition to the molded part so that the shaped part upon removal from the mold contains a firmly adherent coating of the coating composition.

16 Claims, No Drawings

PROCESS FOR PREPARING POLYURETHANE MOLDED PART

This application is a continuation-in-part of my co-pending application Ser. No. 087,768, filed Oct. 24, 1979 now abandoned which in turn is a continuation-in-part of my application Ser. No. 038,505, filed May 14, 1979, now abandoned.

This invention relates to a process for producing a molded polyurethane product having a firmly adherent coating and to the coated product so produced.

The reaction injection molding process for producing elastomeric polyurethane parts is well known. In such a process, two separate liquid components are fed, under very precise control, into a high pressure impingement mixer. One component is a polyol and may include a chain extender, catalyst and small amount of blowing agent; the other component is an isocyanate. After intimately mixing the components, they are injected into a metal mold at a pressure of from 1500 to 2500 psig. The heat of reaction volatilizes the blowing agent, yielding a foam which exerts sufficient pressure to fill out the mold. The result is an integral skin microcellular elastomeric shaped part. The process is very economical and produces shaped parts of high quality for use, for example, as bumpers and front fascias for automobiles.

Normally, after a part is prepared by the foregoing reaction injection molding process and is removed from the mold, it is trimmed and post-cured at 250° F. for about one half hour to complete the reaction. If the part is to be painted, as it normally is for automotive uses, the part must be intensively precleaned with a solvent and hot water detergent to remove the mold release, then coated with a primer composition, baked at 250° F. for about one quarter hour, top coated and then baked again at 250° F. for about one half hour to cure the paint composition. The process of cleaning, priming and painting the part requires considerable expenditure of energy and time and it would accordingly be desirable to simplify and thus reduce the cost of the post-molding treatment of the polyurethane part.

It is accordingly an object of the present invention to reduce the number of steps and thus the cost of preparing a finished polyurethane molded part.

It is an additional object of the present invention to provide a finished polyurethane molded part having a protective or decorative coating of improved adherence and uniformity.

It is a more specific object of this invention to provide an improved process for producing a painted polyurethane part by the reaction injection molding process.

It has been found that the foregoing and other objects may be achieved by coating the surface of the mold, prior to molding the part, with a coating composition containing a polyurethane catalyst in an amount sufficient to transfer said coating composition from said mold surface to said molded part and bond it thereto. The shaped part removed from the mold contains a firmly adherent coating of said coating composition. The catalyst has been found to provide active sites in the coating which act to bond the coating composition to the molded part. The process may be used with a variety of protective or decorative coating compositions. In the case of a paint coating, the primer may, for example be applied in the mold while the top coat is applied externally of the mold. Such a process eliminates the intensive cleaning operation previously necessary before the paint composition is applied because no release agent is necessary in the mold. Furthermore, the amount of curing time and energy necessary for the paint is reduced because the paint is partially cured in the mold. Moreover, the quality of the paint or other coating is enhanced—it is more firmly adhered and more uniform than coatings placed on the part subsequent to molding. An additional advantage is that the coating transfers completely with each molding operation. Because no release agent is necessary, there is no build-up of wax or other release agent in the mold from successive molding operations which periodically requires cleaning of the mold.

The process of the present invention has a number of other advantages. The coating process is not sensitive to film thickness, a sensitivity usually characteristic of this kind of process. Film thicknesses may range from 0.1 mil or even less to above 2.5 mil. The process of the invention is useful with a wide variety of metal mold surfaces, as for example, nickel plated steel, electroform nickel and kirksite (a zinc alloy). The process involves a very short flash off time—less than 15 seconds—and hence is adaptable to production operations. Demold time, or the time from injecting the polyurethane reactants into the mold until the mold is opened, ranges from a few seconds to five minutes, normally from 30 seconds to two minutes. The coatings are consistently uniform and thus coatings of controlled thickness can be obtained under production conditions.

Transfer coatings—that is, coatings applied to a mold and transferred to a shaped product during molding—are known. However, such coatings have only been used with rubber molds because there is no adhesion between such molds and the coating. Rubber molds are used for low pressure molding and hence cannot be used for reaction injection molding, which is a high pressure process for polyurethane. In the absence of an activator, the transfer coatings of the present invention will stick to the mold and will not adhere to the molded part. Moreover, there will similarly be no adherence to the molded part if the activator (the polyurethane catalyst) is added to one or the other of the reactant components fed to the mold rather than to the coating. If the activator is added to one of the reactant components, there will be no active sites available in the transfer coating on which the isocyanate and the polyol may react.

The transfer coating may be any decorative or protective coating of the type applied by conventional coating technology to reaction injection molded parts. The coatings may be either a thermoplastic or thermosetting polymer, with or without a plasticizer. The coating should of course be capable of withstanding the molding temperatures, i.e. temperatures of from 90° to 180° F., without melting or decomposing. Among the useful coatings included within the foregoing description are, for example, acrylic and acrylic ester polymers, pre-reacted urethane polymers, saturated and unsaturated polyesters, epoxy esters, cellulose esters, polyolefins, vinyl and vinly-melamine polymers and mixtures of the foregoing polymers with each other or with other coating compositions. A preferred class of coatings are those based on urethane or acrylic polymers, either as protective coatings or with a pigment as a paint coating. A particularly preferred class of transfer coatings are paint primers. The paint primers may be applied within the mold and the molded part thereafter top coated after removal from the mold.

In the practice of the invention, if the reaction injection molding process utilizes a blowing agent, a microcellular polyurethane part having an integral skin thereon is produced. The process is a "self-skinning" process in that no separate steps or components are needed to produce an integral skin on the surface of the part. If a blowing agent is omitted, a solid polyurethane part is produced. In its preferred form, the product of the present invention is a microcellular elastomeric part. It is produced by mixing two liquid components contained in separate vessels, one of the components being a polyol, including a chain extender, catalyst and a small amount of blowing agent. The other liquid component is the polyisocyanate portion. Various highly reactive long chain polyether polyols containing primary hydroxy groups have been incorporated with short chain polyols to give desired end properties when they react with the isocyanate. The ratio of isocyanate to polyol should be approximately stoiciometric, although a small stoiciometric excess of the isocyanate is normally used—from 2 to 5%—to insure completion of the reaction. The viscosity of each reactant is normally below 1500 cps at 25° C. The two reactants are fed, under very precise control with high pressure metering pumps, from the vessels into a static impingement mixhead. In the mixhead, the reactants are intimately mixed and then injected into a closed mold to which the mixhead is attached. Line pressures between the pumps and mixhead normally range from 1500 to 2500 psig. The mold is filled to about 90% of its capacity. The heat of reaction volatilizes the blowing agent, yielding a foam which exerts sufficient pressure to fill out the mold. The resulting product is an integral skin microcellular elastomeric part. This reaction injection molding process is described at various places in the literature, as for example, in an article entitled "Advances in Reaction Injection Molding" by S. H. Mepzger, Jr. and D. J. Prepelka which was published in *Advances in Urethane Science and Technology*, edited by K. Frisch, Technomic Publication Co., Inc., Vol. 4 (Vol. 1–6 were published from 1971–1978). Other relevant literature describing the process appears in *Modern Plastics Encyclopedia*, McGraw-Hill Publications Co., pages 352 et seq. (1978) and in the text *Introduction to Reaction Injection Molding*, F. Melvin Sweeney, Technomic Publication Co., Inc., (1979).

The present process should not be confused with processes for forming skins on foamed plastic, products which would otherwise not contain a skin. Such processes, utilizing low pressure molding techniques, are shown, for example, in U.S. Pat. Nos. 3,487,134 and 3,694,530. These processes involve the formation of a skin within the mold; rather than the spraying of an already formed coating onto a mold surface and the transfer and bonding of that coating to a molded part. Any catalysts used in such prior art processes are for catalyzing the reaction involved in the in-situ skin formation. The activator used in the present process does not act as a catalyst for the coating. The coating is either already completely reacted, as in the case of a polyurethane coating, or is partially reacted, as in the case of certain acrylic coatings, but any further reaction or polymerization is not catalyzed by the activator. As in other conventional molding processes, such prior art skin-forming processes require the use of a release agent with metal surface molds—thus avoiding one of the important processes and product advantages of the present invention. In the preferred practice of the present invention, the process is self-skinning, so that the present transfer coating technique is in addition to the integral skin already formed on the molded part.

In carrying out the invention, the mold, which should be clean and dry, is brought to a temperature of 90° to 180° F., usually from 120° to 150° F., in most instances about 135° to 150° F. No wax is required to seal the mold surface, even in the case of kirkside molds which normally require such treatment. Moreover, as previously indicated, no release agent need be sprayed onto the mold surface as the coating itself acts as a release agent. The coating may be a conventional urethane based resin primer or a modified acrylic resin based primer containing a polymethylmethacrylate type of acrylic resin. A preferred example is an acrylic based resin containing nitrocellulose, a polymethylmethacrylate resin, a plasticizer such as monoethyl ether acetate and a pigment. The primer will be mixed with a thinner, a particularly suitable example of which consists of a mixture of methyl ethyl ketone, methyl isobutyl ketone and toluol. Other organic solvents in which the primer is soluble may of course be used as a thinner. The transfer coat should normally be mixed with from 0.05 to 10%, by total weight of the transfer coating, of an activator. Amounts of an activator greater than 10% may be used but are normally unnecessary. In some instances, it may also be possible to use the activator in an amount less than 0.05% if a very strong catalyst is used. However, normally the amount will be from 0.05 to 10%, and preferably from 1 to 3%. The activator is a polyurethane catalyst which helps create a bond between the transfer coat and the molded part. Suitable examples of catalysts useful in the invention are stannous octate, 1,4-diazabicyclo (2,2,2) octane, phenyl mercuric proprionate, triethylene diamine and N,N',N"-tris (dimethylamino-propyl)-sym-hexahydrotriazine. A particularly suitable activator is dibutyltin dilaurate.

Illustrative examples of other activators which may be used in the practice of the invention are organometallic salts including cobalt, manganese, zinc and zirconium naphthenate; cobalt and lead benzoate; zinc, cobalt, manganese, lead and zirconium 2-ethylhexoate; cobalt octoate; stannous, lead and potassium oleate; sodium propionate; and lithium acetate. Metal chloride salts are also useful as activators such as stannous chloride and antimony trichloride and pentachloride. Other amino activators are N-tetramethylethylenedamine, N-tetramethyl-1-3 butanediamine, tetramethyl quanidine, 4-dimethylaminopyridine, triethylamine, N-ethylmorpholine, N-N-dimethylbenzylamine, 1,2,4-trimethyl piperazine, ethylene diamine, dimethylamino ethyl piperazine and N-amino-ethyl piperazine.

The following examples illustrates the practice of the invention. All parts and percentages, unless otherwise indicated, are by weight.

EXAMPLE 1

The resin component was an ethylene oxide capped poly(oxpropylene) glycol containing 20 weight percent styrene/acrylonitrile copolymer and, ethylene glycol or 1,4-butane diol as a chain extender, dibutyltin dilaurate as a catalyst and Freon 11 (a trademark for a fluorocarbon) as a blowing agent. The isocyanate was 4,4'-diphenyl methane diisocyanate. The resin and isocyanate were separately brought to 95° F. and then mixed at a pressure of 1600 psig in each feed line to the mixer. The ration of isocyanate to resin was 0.72. Nucleation of resin by mixing with air brought the specific gravity of the reaction product to one. The high pressure recycle time was 5 seconds.

An automobile bumper fascia was then reaction injection molded with the foregoing reactants. The mold surface of electroformed nickel was initially sprayed with a clear grease release agent in toluene for the first molding cycle. Thereafter no further release agent was applied. The mold surface was then uniformly sprayed at 30 psig with a coating of the primer mixed with an equal part by weight of thinner. The coating contained 6%, by total weight of the coating including thinner, of dibutyltin dilaurate. The primer consisted of nitrocellulose, a polymethylmethacrylate resin, monethyl ether acetate as the plasticizer and a pigment to impart the desired color. The thinner was allowed to flash off for about 15 seconds. The mold was maintained at 135° F. and the mixed reactants were injected into the mold after the mold was closed. The part was demolded after two minutes. The part was wiped with a solvent to remove any dust, then post-cured at 250° F. for 30 minutes to complete the cure of the polyurethane. It was then topcoated by spraying with a polyurethane paint.

A number of samples of molded bumper fascias containing a coating of primer and topcoat produced in accordance with the foregoing example were subjected to a series of tests to determine the suitability of the paint coatings. All tests were performed in accordance with the specification of a major U.S. auto manufacturer for paint coatings on plastic parts for exterior use. The tests included hardness, adhesion, flexibility, serviceability, water resistance, weathering resistance, thermal shock resistance, resistance to water and soap spotting and to acid spotting, gasoline resistance, chip resistance, oil resistance, resistance to scuffing, heat resistance and resistance to galvanic action. All results indicated that the in-mold paint samples, produced in accordance with Example 1, met or exceeded the specifications and were as good in the foregoing results as parts painted outside the mold in accordance with standard procedures. The coatings exceeded prior art coatings in adherence to the part and in uniformity.

EXAMPLE 2

Example 1 was repeated except that the mold surface was completely stripped of any mold release before the transfer coating was applied to the mold surface. No mold release was thereafter used. Release from the mold surface was excellent. A number of parts were molded without any cleaning of the mold. The parts exhibited substantially the same properties as those of Example 1.

EXAMPLE 3

A reaction injection molded high modular urethane elastomer system was used for making in-mold coated parts. The system consisted of a resin component of a high molecular weight poly (oxypropylene) glycol grafted with a styrene/acrylonitrile copolymer, a chain extender of 1,4-butane diol and a urethane catalyst of dibutyltin dilaurate. The second component of the system was a polyisocyanate based on 4,4'-diphenyl methane diisocyanate and a small amount of Freon 11 as a blowing agent. The following processing conditions were used:

| | |
|---|---|
| Isocyanate Index | 107 |
| Resin/Isocyanate wt ratio | 1.0/1.0 |
| Resin Temperature | 55° C. |
| Isocyanate Temperature | 24° C. |
| Mold Temperature | 70° C. |
| Demold Time | 60 seconds |

The mold was a flat plaque steel mold. The transfer coating was the same as that of Example 1 except that it contained 1% by weight of the activator-dibutyltin dilaurate. The transfer coating was sprayed onto the mold surface after completely stripping any mold release from the surface. The thinner was allowed to flash off for 10 seconds. The reaction mixture was injected into the mold after the mold was closed.

The part demolded after one minute. The coating completely transferred to the part. A number of additional parts were made over the course of a day with excellent release and absolutely no cleaning of the mold between shots. Release was excellent even from the vertical areas of the plaque. Flash was easy to remove.

EXAMPLE 4

Examples 1 and 2 were repeated but no activator was added to the coating. The coating did not adhere to the molded part. In both experiments the coating stuck to the mold surface. Where a release agent was used, the coating could be peeled from the mold. Otherwise, it required a solvent to remove the coating from the mold surface.

EXAMPLE 5

Example 2, in which flexible fascia material was used to make automobile bumpers, was repeated with different levels of the activator-dibutyltin dilaurate in the coatings. The levels used were 0.05, 0.1, 0.15, 0.25, 0.5, 1,2,3,4,5,6 and 10% by weight. In each case, the parts released from the mold and the coatings adhered to the parts. However, optimum results were obtained with between 1 and 3% by weight of activator.

EXAMPLE 6

Examples 2 and 3 were repeated except that 3 and 6% respectively of each of the following activators were substituted for dibutyltin dilaurate: stannous octoate, 1,4-diazabicyclo (2,2,2) octane (triethylene diamine), phenyl mercuric propionate and N,N"N"'-tris(dimethylamino-propyl)sym-hexahydrotriazine. Excellent release from the mold and adhesion of the coating to the part was observed in each case.

EXAMPLE 7

The same procedure as in Example 2 was followed for preparing and spraying the transfer coating onto the mold surface. But in this example, a rigid urethane foam was used as a substrate material. The rigid urethane foam is supplied under the trademark Baydur 722 and consists of an isocyanate component and a polyol component, the latter containing a chain extender and catalyst. A steel plaque mold was used. The resin temperature was 95° F., the mixing ratio of isocyanate to resin was 170/100. The mold was completely stripped of any mold release before the coating was applied to the mold surface. Excellent release from the mold surface was obtained. Adhesion of the coating to the part was excellent. The experiment was again repeated except that the Freon 11 blowing agent was omitted and a solid, non-porous part was produced. Again excellent release and adhesion of the coating to the molded part was obtained.

EXAMPLE 8

The process of Example 2 was followed to produce an automobile bumper fascia utilizing an isocyanate component and a polyol component, the latter containing a chain extender and a catalyst and supplied by Mobay Chemical Company under the trademark Bayflex 110–50. The component temperatures prior to molding were 75° F. for the isocyanate and 104° F. for the polyol. No mold release was used. Injection time was 1.85 seconds; injection rate was 150 lbs/minute; mold temperature was 145° F.; demold time was 2 minutes.

A series of paint coatings were sprayed onto the mold surface, each coating containing a pigment to give the desired color. The coatings were commercially available paint compositions, each coating containing an amount by weight of thinner approximately equal to the weight of the resin base. In each case, flash-off time was 15 seconds, the activator was 1% of dibutyltin dilaurate and the part released from the mold without difficulty. The initial adhesion of the coating to the part was tested by inscribing the in-mold coated part surface with a knife, applying cellophane tape to the inscribed portion of the coating and removing the tape. The polymer coating base, coating thickness and initial adhesion results are set forth in the following table.

| Sample No. | Coating Base | Coating Thickness (mils) | Initial Adhesion |
|---|---|---|---|
| 1 | Mixture of chlorinated polyolefin and epoxy ester resin | 0,5 | Good |
| 2 | Mixture of polymethyl methacrylate and cellulose acetate butyrate | 0.3 | Excellent |
| 3 | Mixture of polymethyl methacrylate and cellulose acetate butyrate | 0.5 | Excellent |
| 4 | Acrylic butyrate resin | 0.5 | Good |
| 5 | Acrylic butyrate resin | 0.2 | Good |
| 6 | Acrylic butyrate resin | 0.3 | Good |

The foregoing results indicate that each of the identified coatings may be used for producing in-mold coatings in accordance with the invention.

The process is applicable to any polyurethane part produced by reaction injection molding techniques from a two component system, one of which is normally an isocyanate and the other a polyol. The part may be rigid or flexible, porous or non-porous, although as previously indicated, it is preferably self-skinning, flexible and porous.

The foregoing is a description of illustrative embodiments of the invention and it is applicant's intention in the appended claims to cover all forms which fall within the scope of the invention.

I claim:

1. In a process for producing a molded polyurethane part by reaction injection molding in which the polyurethane reactants are mixed to form a liquid mixture, the mixture is fed to a mold where the mixture is reacted and molded at elevated temperatures and a shaped part is removed from said mold, the improvement comprising
    coating the surface of said mold, prior to molding said part, with a coating composition containing a polyurethane catalyst, said catalyst acting as a catalyst for said polyurethane part but not for said coating, said catalyst being present in an amount sufficient to transfer said coating composition from said mold surface to said molded part and bond it thereto so that the shaped part removed from the mold contains a firmly adherent coating of said coating composition.

2. The process of claim 1 in which the coating composition contains from 0.05 to 10% by weight of a polyurethane catalyst.

3. The process of claim 1 in which said coating composition is selected from the group consisting of acrylic, urethane, olefin and polyester polymers.

4. The process of claim 1 in which said coating composition is a paint.

5. The process of claim 1 in which said coating composition is a paint primer.

6. The process of claim 5 in which the paint primer is an acrylic polymer based primer.

7. The process of claim 1 in which said coating composition is sprayed onto the surface of said mold.

8. The process of claim 2 in which said coating contains from 1–3% by weight of the coating composition of the polyurethane catalyst.

9. The process of claim 1 in which the catalyst is dibutyltin dilaurate.

10. The process of claim 1 in which excellent release of the molded part is obtained from said mold without the prior use of a release agent on the surface of said mold.

11. The process of claim 1 in which demold time is less than five minutes.

12. The process of claim 11 in which demold time ranges from 30 seconds to two minutes.

13. The process of claim 1 in which the mold surface is a metal.

14. A reaction injection molded polyurethane part having a firmly adherent uniform coating applied to the molded part within the mold in accordance with the process of claim 1.

15. In a process for producing a microcellular molded polyurethane part having an integral skin thereon by reaction injection molding in which the polyurethane reactants are mixed to form a liquid mixture, the mixture is fed to a metal surface mold where the mixture is reacted and molded at elevated temperatures and a shaped part is removed from said mold, the improvement comprising coating the surface of said mold, prior to molding said part and without the use of a release agent, with a paint composition containing from 0.05 to 10% by weight of the paint composition of a polyurethane catalyst, said catalyst acting as a catalyst for said polyurethane part but not for said paint composition, and molding said part while simultaneously transferring said paint composition from said mold surface and bonding it to said molded part, said process producing an integral skin microcellular shaped polyurethane part having a firmly adherent paint coating thereon.

16. A reaction injection molded microcellular polyurethane part having an integral skin and a firmly adherent uniform paint coating thereon, said part being produced in accordance with the process of claim 15.

* * * * *